(12) United States Patent
Beale et al.

(10) Patent No.: US 7,440,108 B2
(45) Date of Patent: Oct. 21, 2008

(54) IMAGING SPECTROMETER INCLUDING A PLURALITY OF POLARIZING BEAM SPLITTERS

(75) Inventors: John Edward Perrigo Beale, Malvern (GB); Andrew Robert Harvey, Edinburg (GB); David William Fletcher-Holmes, Edinburg (GB)

(73) Assignee: Qinetiq Limited (GB)

( * ) Notice: Subject to any disclaimer, the term of this patent is extended or adjusted under 35 U.S.C. 154(b) by 576 days.

(21) Appl. No.: 10/518,418

(22) PCT Filed: Jun. 19, 2003

(86) PCT No.: PCT/GB03/02642

§ 371 (c)(1),
(2), (4) Date: Dec. 17, 2004

(87) PCT Pub. No.: WO2004/005870

PCT Pub. Date: Jan. 15, 2004

(65) Prior Publication Data

US 2005/0237532 A1    Oct. 27, 2005

(30) Foreign Application Priority Data

Jul. 2, 2002    (GB) ................. 0215248.6

(51) Int. Cl.
*G01B 9/02*    (2006.01)
(52) U.S. Cl. ................... 356/456; 356/491
(58) Field of Classification Search ........... 356/451, 356/455, 491, 452, 456
See application file for complete search history.

(56) References Cited

U.S. PATENT DOCUMENTS 4,320,973 A    3/1982    Fortunato et al.

(Continued)

FOREIGN PATENT DOCUMENTS

DE    4016731    * 11/1991

(Continued)

OTHER PUBLICATIONS

Search Report from the Great Britain Patent Office for Application No. GB 0215248.6.

*Primary Examiner*—Hwa (Andrew) S Lee
(74) *Attorney, Agent, or Firm*—McDonnell Boehnen Hulbert & Berghoff LLP

(57) ABSTRACT

The present invention relates to an imaging apparatus and comprises input and output polarisers, a first polarising beam splitter and at least one additional polarising beam splitter, a light sensitive detector and focussing means arranged on an axis. The input polariser resolves incident light into a single linear polarisation state. The first polarising beam splitter receives light from the input polarises, and resolves it into equal magnitude orthogonally polarised rays which are mutually spaced and have a path difference therebetween. The or each additional polarising beam splitter is arranged to receive light from the first polarising beam splitter. The transmission axis of the output polariser is parallel to or perpendicular to the transmission axis of the input polarises to resolve the orthogonally polarised light rays having past through the or each additional polarising beam splitter into the same or perpendicular polarisation state as light resolved by the, first polariser. The first polarising beam splitter, the or each additional polarising beam splitter and the focussing means are mutually spaced such that said mutually spaced rays are brought to coincidence whereby interference fringes are produced, the detector being arranged to detect the interference fringes. One beam splitter is mounted for movement perpendicular to said axis, whereas the other beam splitter(s) is/are rigidly mounted against movement.

11 Claims, 4 Drawing Sheets

U.S. PATENT DOCUMENTS 5,469,259 A    11/1995  Golby et al.
5,781,293 A *   7/1998  Padgett et al. ............... 356/453

FOREIGN PATENT DOCUMENTS

| | | |
|---|---|---|
| GB | 2245381 | 1/1992 |
| JP | 7270115 | 10/1995 |
| JP | 9281402 | 10/1997 |
| WO | WO 99/06807 | 2/1999 |

* cited by examiner

⊙ Direction of optic

↕ Axis in Wollaston prisms

⊙ Direction of optic

↕ Axis in Wollaston prisms

⊙ Direction of optic

↕ Axis in Wollaston prisms

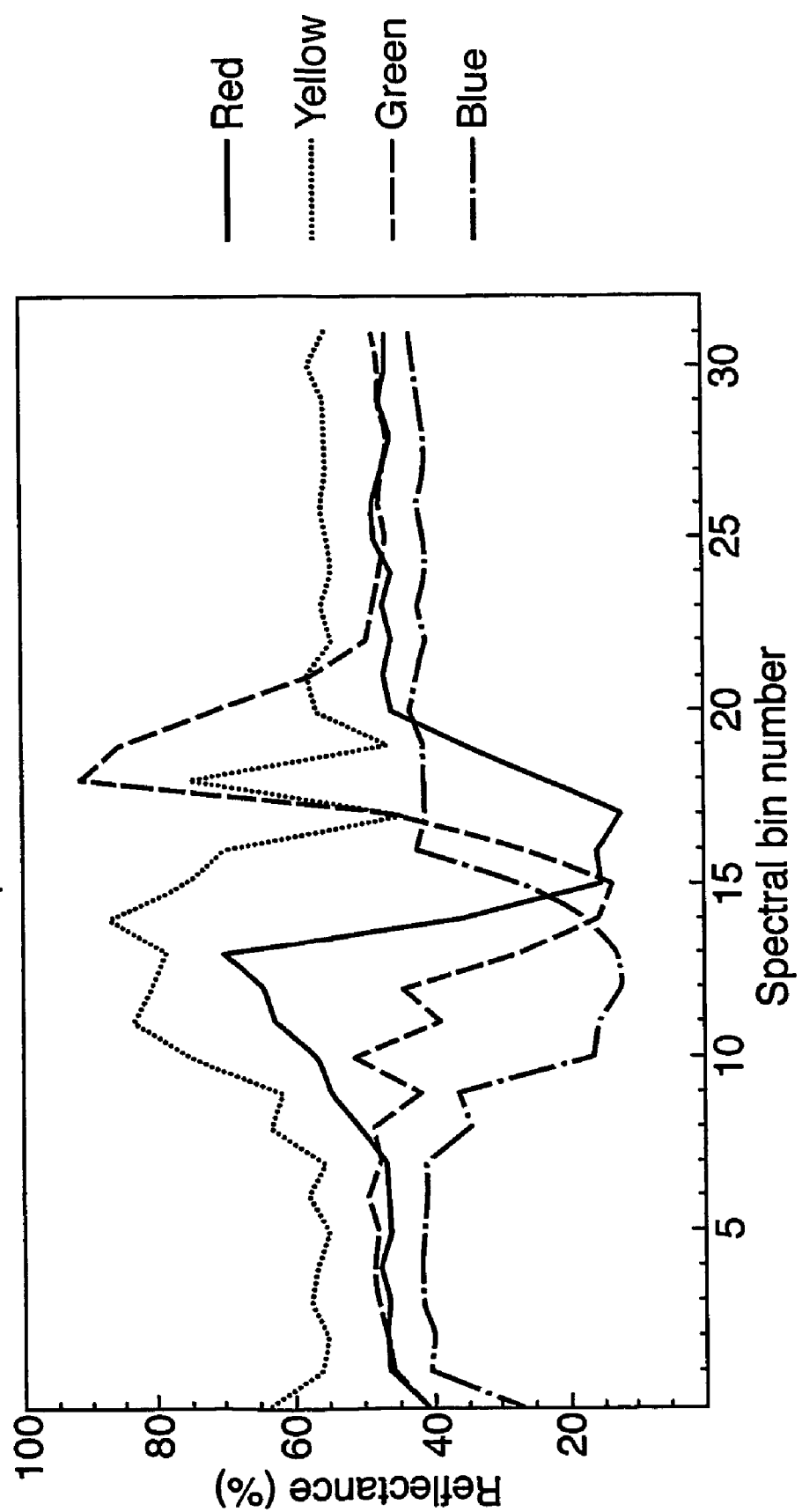

IMAGING SPECTROMETER INCLUDING A PLURALITY OF POLARIZING BEAM SPLITTERS

The present invention relates to an imaging apparatus and to the use of such an apparatus as an imaging spectrometer.

Figure 1:
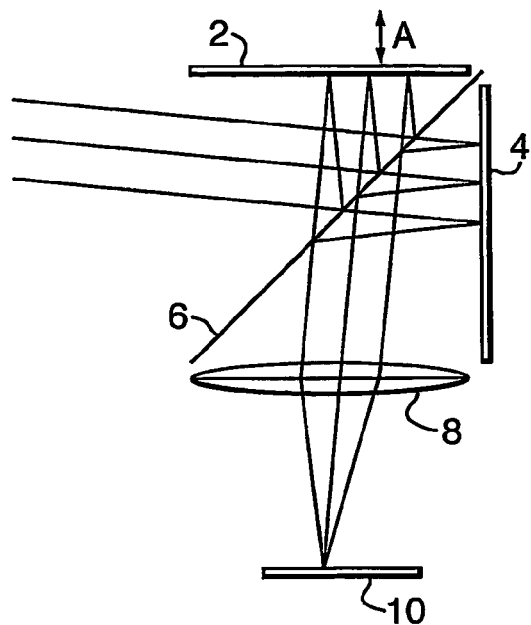

FIG. 1 is a schematic representation of an imaging spectrometer incorporating a Michelson-type interferometer. The spectrometer comprises first and second mirrors 2,4 a beam splitter 6, lens 8 and detector array 10. An image is formed at the detector array from light which has been reflected from both the first and the second mirror 2,4. It will be understood that scanning the first mirror 2 along the optical axis of the system (as indicated by arrow A) produces an interferogram as a function of time and optical path difference at each pixel in the detector array 10. Fourier transformation of the interferogram obtained from each pixel then yields the spectrum of light in that pixel enabling a spectral data cube to be generated from the recorded interferogram cube. The system is optically efficient since no light is lost through spatial or spectral multiplexing, although it will be understood that, on average, 50% of the light is reflected back towards the source;

A disadvantage of the above described system for practical applications is that very high quality, expensive, mirror movement is required to scan the moving mirror with an accuracy and precision of better than $\lambda/20$ (that is, better than 20 nm for blue light). In addition, vibration of the interferometer structure produces phase modulations of the interferogram that will easily mask the sought interferogram.

U.S. Pat. No. 5,781,293 discloses the use of Wollaston prisms in a non-imaging Fourier transform spectrometer to produce spatial interferograms, that is the spectrum of a light source is obtained across the detector array as a single "snapshot". The stated aim of the patent is to produce a Fourier transform spectrometer with no moving parts.

It is an object of the present invention to provide an imaging apparatus which obviates or mitigates one or more disadvantages of the Michelson-type interferometer, and which is suitable in imaging spectrometer applications.

According to the present invention, there is provided an imaging apparatus comprising on an axis:

an input polariser for resolving light incident thereon into a single linear polarisation state, a first polarising beam splitter arranged to receive light passing through the input polariser, and arranged to resolve said light into equal magnitude orthogonally polarised rays, said rays being mutually spaced and having a path difference therebetween, at least one additional polarising beam splitter arranged to receive light passing through the first polarising beam splitter, an output polariser orientated such that its transmission axis is parallel to or perpendicular to the transmission axis of the input polariser for resolving the orthogonally polarised light rays having passed through the or each additional polarising beam splitter into the same or perpendicular polarisation state as light resolved by the first polariser, focussing means, the first polarising beam splitter, the or each additional beam splitter and the focussing means being mutually spaced such that said mutually spaced rays are brought to coincidence whereby interference fringes are produced, and a light sensitive detector arranged to detect said interference fringes, wherein one beam splitter is mounted for lateral movement, i.e. movement perpendicular to said axis, relative to the other beam splitter(s).

Thus, in use, a temporal interferogram at the detector is produced during scanning of the beam splitter.

It will be understood that the interference generated between the resolved rays is due to the path difference introduced therebetween by virtue of their passage through the polarising beam splitters.

Preferably, at least one polarising beam splitter is a Wollaston prism and more preferably, each beam splitter is a Wollaston prism. It will be noted that although Wollaston prisms traditionally have mutually orthogonal optic axes, other angles between the optic axes are possible in the present invention, and the term "Wollaston prisms" should be construed accordingly. The choice of material for the Wollaston prism(s) is dependent upon the wavelengths of light to be imaged. For example, calcite is useful for visible wavelengths, whereas tellurium is useful for medium wave infrared wavelengths.

In a first series of embodiments, a lens (as the focussing means) and only one additional beam splitter is provided.

In a first arrangement, the beam splitters are mutually positioned such that the orthogonally polarised rays having passed therethrough are linearly spaced and parallel, the lens being provided between the beam splitters and the detector to bring said parallel rays, after being resolved by the output polariser, into coincidence at the detector.

Where the beam splitters are Wollaston prisms, the first arrangement can be achieved by using identical mutually approximately parallel prisms arranged such that the exiting rays are mutually parallel. For example, the prisms may be aligned such that they are oppositely orientated with respect to their wedge angle.

In a second arrangement, the beam splitters are positioned between the lens and the detector, the mutual spacing of the beam splitters and the detector being such that the rays passing through the lens and beam splitters are brought to coincidence at the detector.

In a second series of embodiments, two additional beam splitters are provided, the beam splitters being arranged such that the orthogonally polarised rays having passed therethrough are parallel (or co-axial) the lens being provided between the beam splitters and the detector to bring said parallel (or co-axial) rays, after being resolved by the output polariser, into coincidence at the detector.

Where the beam splitters are Wollaston prisms, the second series of embodiments can be achieved by using two identical prisms mounted in parallel, with the third prism having twice the wedge angle of the other two prisms being mounted therebetween, the third prism being oppositely orientated with respect to its wedge angle to the other two prisms.

Preferably, the detector is connected to a processor, said processor being capable of carrying out Fourier transformation on the interference fringes at the detector, whereby to yield the spectrum of light incident on the detector.

Figure 2:
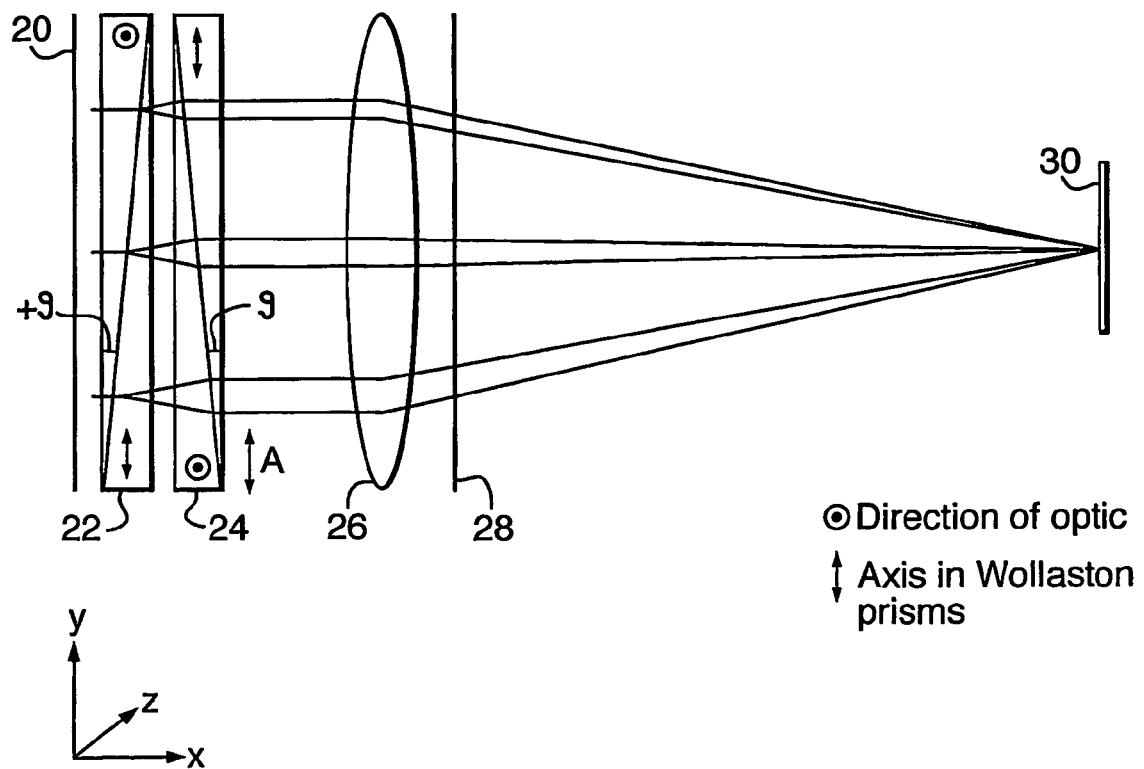
Figure 3:
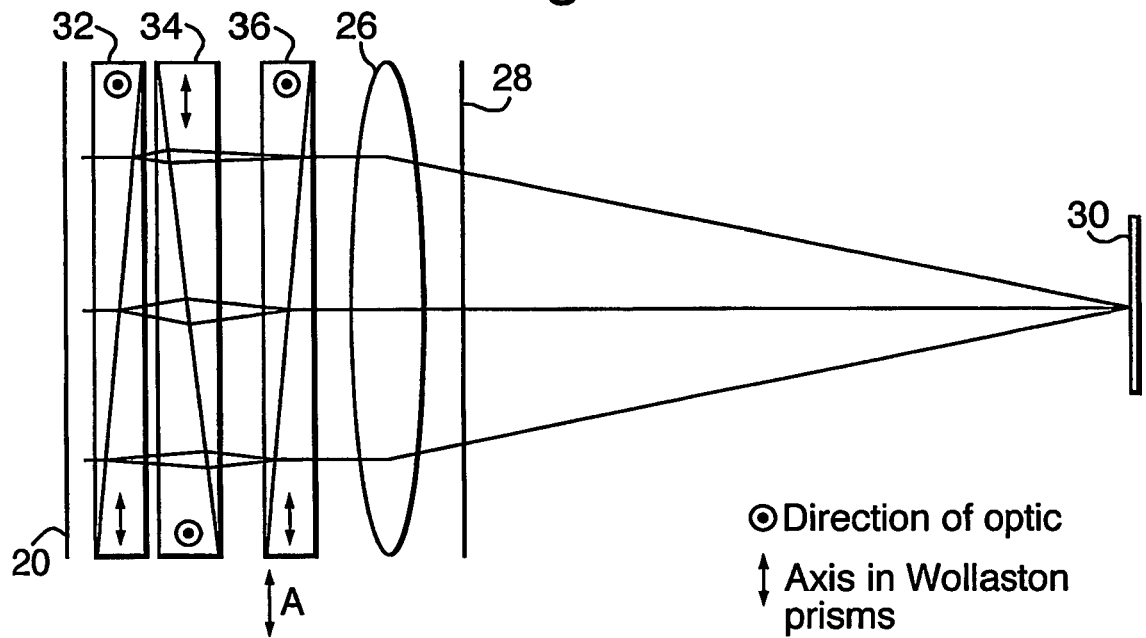
Figure 4:
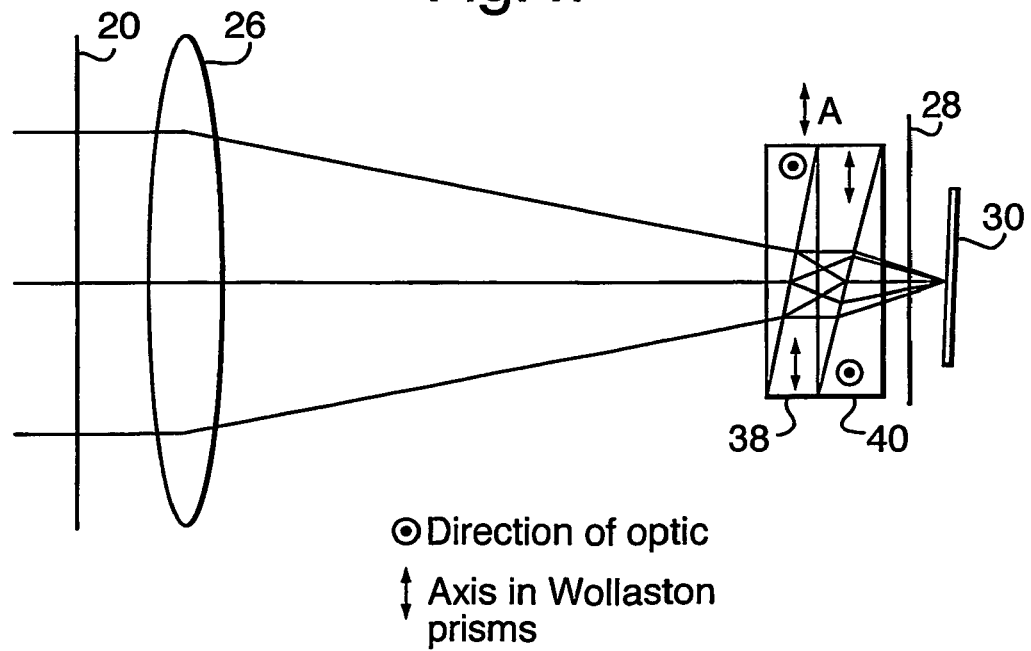
Figure 5:
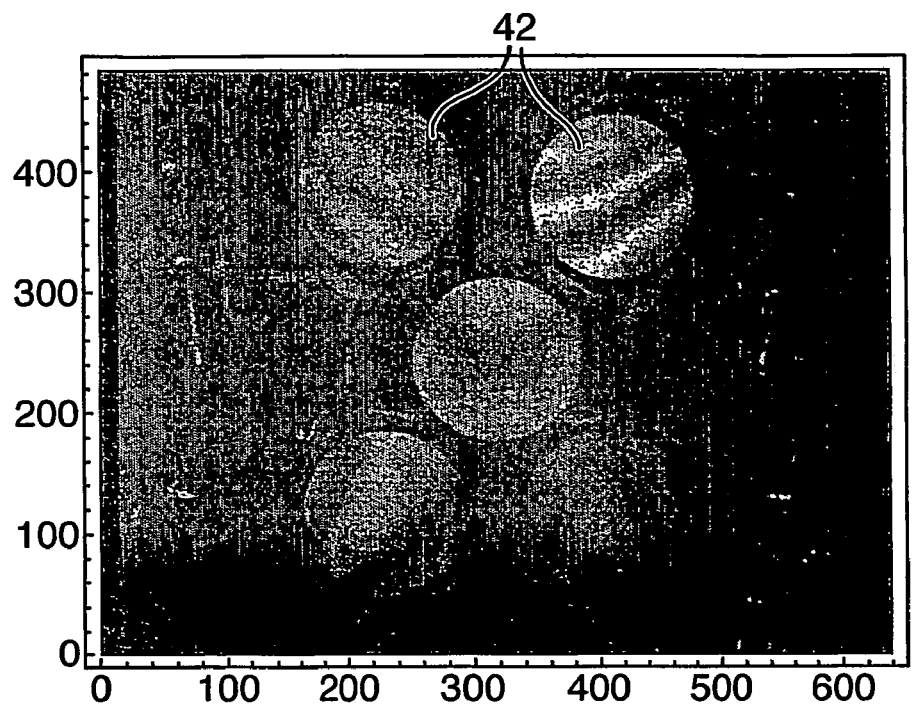
Figure 6:
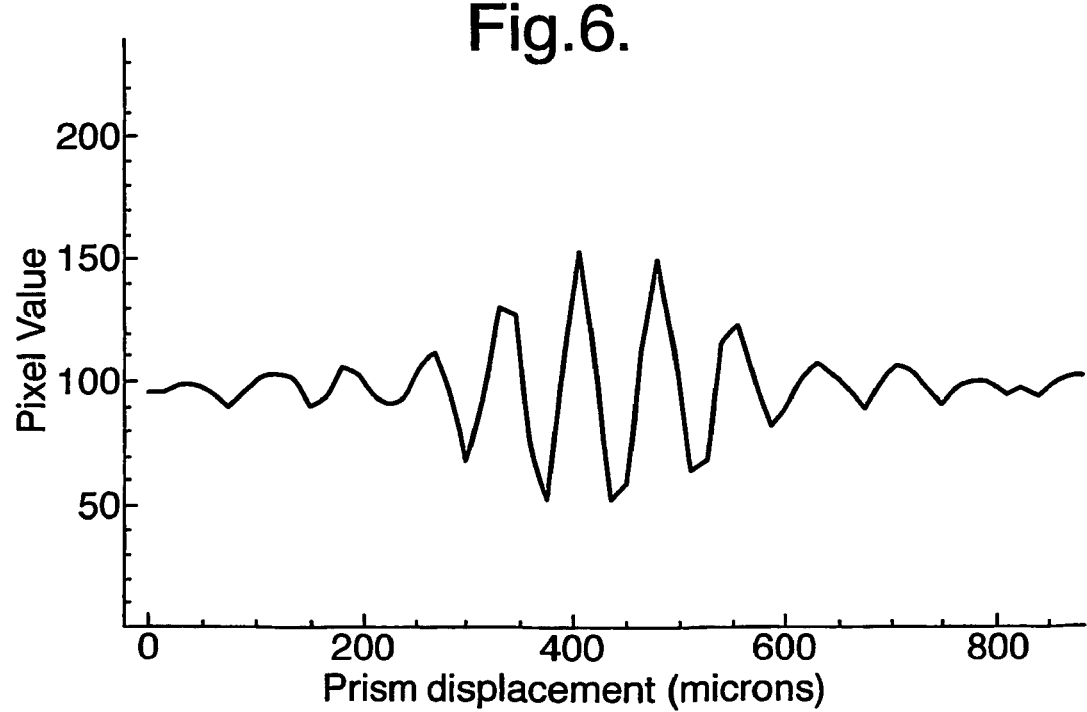

Embodiments of the invention will now be described by way of example only with reference to the accompanying drawings in which:

FIG. 1 is a schematic representation of a Fourier-transform imaging spectrometer based on a Michelson interferometer, FIGS. 2 to 4 are schematic representations of different embodiments of imaging spectrometers in accordance with the present invention, FIG. 5 is an image of coloured calibration discs taken using imaging apparatus in accordance with FIG. 2, FIG. 6 Is an interferogram taken at a single pixel of the image of FIG. 5, and FIG. 7 is a plot of reflectance spectra for the calibrated discs imaged in FIG. 5.

Referring to FIG. 2, a first configuration of an imaging spectrometer comprises the following elements arranged sequentially and mutually spaced along the x-axis; an input polariser 20, first and second Wollaston prisms 22,24 a focussing lens 26, an output polariser 28 and a detector array 30, each element being arranged perpendicularly to said axis in the yz-plane. The two polarisers 20,28, the first Wollaston prism 22, the focussing lens 26 and the detector array 30 are securely mounted in a housing (not shown). The second Wollaston prism 24 is also mounted in the housing, but is capable of linear movement ("scanning") along the y-axis (indicated by arrow A). The first and second prisms 22,24 are made from calcite and are oppositely orientated such that the wedge angle of the first prism is defined as a positive angle (θ) with the yz-plane, whereas the wedge angle of the second prism is defined as a negative angle (−θ) relative to the yz-plane.

The input and output polarisers 20,28 each have their transmission axes at an angle of +45° to the xy-plane, although it will be understood from what follows that in other embodiments this angle could be −45° for one or both of the polarisers 20,28. The lens 26 is arranged to focus light having passed through the prisms 22,24 at the detector array 30.

In use, light linearly polarised by the input polariser 20 is resolved into equal magnitude orthogonally polarised components which are mutually linearly and angularly displaced. After passing through the second Wollaston prism 24, the two component rays are parallel. The output polariser 28 resolves the two orthogonally polarised components so that they interfere. For a source at infinity, these rays are from the same source point (and hence are mutually coherent). More generally, rays from any focused source will be brought into coincidence and will interfere. The interference fringes are localised at infinity and are focused by the lens 26 to a common location at the detector array 30 where the interference can be observed.

After transmission through a single Wollaston prism, there is a path difference Δ between the orthogonally polarised components given by $$\Delta = 2(n_o - n_e)d \tan\theta. \quad \text{Equation 1}$$

where $n_o$ and $n_e$ are the ordinary and extraordinary refractive indices of the Wollaston prism material respectively, θ is the wedge angle of the Wollaston prism and d is the displacement from the central position at which the ray passes through the Wollaston prism.

For Wollaston prisms with small wedge angles, the net path difference introduced by transmission through two or more Wollaston prisms is well approximated by the sum of the path differences introduced by each. Thus, for the embodiment shown in FIG. 2, the net path difference is given by $$\Delta = 2((n_{1,o} - n_{1,e})d_1 \tan\theta_1 + (n_{2,o} - n_{2,e})d_2 \tan\theta_2) \quad \text{Equation 2}$$

Since the Wollaston prisms are composed of the same material and the wedge angles can be set as θ=θ$_1$=−θ$_2$ then the path difference is given by $$\Delta = 2(n_o - n_e)(d_1 - d_2)\tan\theta \quad \text{Equation 3}$$

and the path difference is constant across the Wollaston prism and is determined only by the net displacement ($d_1 - d_2$) between the centres of the Wollaston prisms.

Keeping the first prism 22 stationary whilst the second prism 24 is scanned produces a linearly varying path difference between the transmitted rays, resulting in interferometric modulation at the detector array 30. That is, the whole image is modulated simultaneously. As with a conventional spectrometer, Fourier transformation of the interferogram obtained at each pixel yields the spectrum of light at that pixel.

Referring to FIG. 3, a second configuration of an imaging spectrometer is a modified arrangement of the first configuration and comprises three Wollaston prisms 32,34,36 as shown. The first and second prisms 32,34 are fixed relative to each other and the third prism 36 is mounted for scanning along the y-axis. The first and third prisms 32,36 have the same wedge angle (θ), but the second prism 34 is oppositely orientated and has double the wedge angle (i.e. −2θ) of the first and third prisms 32,36.

As shown in FIG. 3, linearly polarised light is resolved into diverging orthogonal components on passing through the first prism 32, the divergent rays becoming converging rays on passing through the second prism 34. After passing through the third prism 36 the rays are parallel with zero linear displacement (i.e. co-axial). As in the previous embodiment, interference fringes are observed after the rays are resolved by the output polariser 28 and focussed at the detector array 30.

For the second configuration, since identical birefringent materials are used in each prism and assuming small wedge angles:

$$\Delta = 2((n_{1,o} - n_{1,e})d_1 \tan\vartheta_1 + (n_{2,o} - n_{2,e})d_2 \tan\vartheta_2 + \quad \text{Equation 4}$$
$$(n_{3,o} - n_{3,e})d_3 \tan\vartheta_3)$$
$$= 2(n_o - n_e)(d_1 \tan\vartheta_1 + d_2 \tan\vartheta_2 + d_3 \tan\vartheta_3)$$

and tan θ=tan θ$_1$=tan θ$_3$=−tan θ$_2$/2 so that approximating θ≈tan θ:

$$\Delta = 2(n_o - n_e)\tan\theta(d_1 - 2d_2 + d_3) \quad \text{Equation 5}$$

so that again the path difference is determined only by the mutual displacements of the Wollaston prisms.

Referring to FIG. 4, a third configuration of a spectrometer is shown. An input polariser 20, lens 26, first and second Wollaston prisms 38,40, an output polariser 28 and a detector array 30 are arranged sequentially along the x-axis. The two prisms 38,40, which may have different wedge angles (θ$_1$ and θ$_2$), are located close to the image plane and at an appropriate distance from the image plane (detector array 30) such that rays passing through the prisms are focussed at the detector array 30 without shear, the interference fringes thereby being localised at the detector array 30. It will be noted that the detector array 30 is inclined slightly relative to the yz-plane. As in the previous configurations, one of the prisms is mounted for scanning relative to the other (arrow A). From equation 4, the path difference introduced between the orthogonal light components is $$\Delta = 2(n_o - n_e)(d_1 \tan\theta_1 + d_2 \tan\theta_2) \quad \text{Equation 6}$$

It is readily apparent from equation 6 that the path difference varies with pixel position depending on the two wedge angles and the values of $d_1$ and $d_2$ at each pixel position. Thus, unlike the first and second configurations in which the path difference across the detector array 30 is constant, in the third configuration, the path difference varies linearly across the detector array 30.

In the preceding discussion, only rays travelling parallel to the optical axis have been considered. The path difference introduced depends also on the angle of incidence of the rays as they pass through the Wollaston prisms. In the first and second configurations the path difference varies with the field angle, whereas for the third configuration the path difference varies with both field angle and the f-number of the cone of rays convergent on the detector array. In addition to the path difference due to translation of the Wollaston prisms, as given by equation 1, the path difference due to the non-normal angle of incidence is given by $$\Delta = \frac{b-a}{ab}(a+b)bt\sin^2 i(\sin^2\varphi - \cos^2\phi) \quad \text{Equation 7}$$

where $a=1/n_e$, $b=1/n_o$, i is the angle of incidence and $\phi$ is the angle made by the plane of incidence with a plane including the optical axis and the normal. This equation describes hyperbolic fringes.

For the first and second configurations, the dependence of the path difference on the field of view is hyperbolic so that static hyperbolic fringes modulate each frame in addition to the temporal modulation introduced by the translation of the Wollaston prism. As a result, the zero path difference position varies hyperbolically, so that during a complete scan, each interferogram has a slightly different origin. Typically this means, that whilst the path difference for the central pixel may scan between, say, $-\Delta_{max}$ and $+\Delta_{max}$, the pixels for scene pixels at a specific angle (i,$\phi$) will simultaneously vary between $-\Delta_{max}+\Delta_{offset}$ (i,$\phi$) and $+\Delta_{max}+\Delta_{offset}$ (i,$\phi$) where $\Delta_{offset}$ (i,$\phi$) will typically be no more than a few wavelengths. In most cases this will not be a significant disadvantage. Similar fringes are also observed for Michelson interferometers, but are circular rather than hyperbolic. Various methods are known for increasing the field of view and reducing the magnitude of $\Delta_{offset}$ (i,$\phi$).

It will be apparent from the foregoing that the recording of interferograms as the Wollaston prism of the imaging apparatus of the present invention is translated is equivalent to the recording of interferograms as the mirror in a Michelson interferometer is translated but with two crucial differences. Firstly, the two interfering rays are essentially co-axial so that vibration effects are common mode and have no net effect— i.e. the apparatus is insensitive to vibration. Secondly, the Wollaston prisms introduce a type of optical gearing such that the path difference between orthogonal polarisations will be a factor of 1/(2 tan θ) (typically a factor of about 100) smaller than the physical mutual displacement of the Wollaston prisms. This means that the Wollaston prisms need be moved with an accuracy and repeatability of only about 10-100 λ (about 4-40 microns in blue light) which can be readily achieved with low-cost mechanics.

In polarised light, the optical efficiency of the described apparatus is 50%; equal to that of a Michelson interferometer. In unpolarised light the optical efficiency is only 25%, but in general, spectral imaging in unpolarised light is not optimal, since the spectrum of specular reflections (as exist in most scenes) varies with polarisation state.

In a further embodiment of the present invention, balanced detection, using two detector arrays, and two instruments observing both orthogonal input polarisations enables 100% optical efficiency to be achieved in addition to polarimetric measurement. This cannot be achieved with a Michelson interferometer.

Having described the general configurations and theory of several embodiments of imaging apparatus in accordance with the present invention, further details of an apparatus having the first configuration will be given, with reference once again to FIG. 2. Calcite Wollaston prisms were used, the first (stationary) prism 22 measuring 20 mm×20 mm and having a wedge angle of 1.5°. The second (scanning) prism 24 had a wedge angle of −1.5° and measured 20×30 mm, so that it could be scanned by ±5 mm. The maximum path difference between emergent components is about 52 μm and the spectral resolution about 96 cm$^{-1}$. It should be noted that the resolution can readily be increased by using a wider prism. The detector array 30 was a CCD detector.

The apparatus was used to image five differently coloured calibration discs 42 (red, yellow, green, blue and grey), and a single frame of the scan is shown in FIG. 5. An image was recorded at intervals of 15 μm which corresponds to an actual path difference of 0.135 μm. The static hyperbolic fringes can be clearly seen. As the second Wollaston prism is translated, the intensity at each pixel is modulated in relation to the path difference introduced. An example interferogram for a single pixel within the yellow disc is shown in FIG. 6, with the calibrated spectral reflectivities at locations within the yellow, red, green and blue disks shown in FIG. 7.

It will be understood from the foregoing that the present invention offers a low cost route to high performance hyperspectral imaging. The resolving power can be high (several thousand) and the spectral range is limited only by the choice of detector and spectral transmission of the polarising beam splitter. For example it is envisaged that the invention may be operable from about 200 μm to beyond 14 μm, i.e. from ultraviolet to beyond long wave infra red.

The invention claimed is:

1. An imaging spectrometer comprising on a longitudinal axis of the spectrometer:
   (i) an input polariser for resolving light incident thereon into a single linear polarisation state,
   (ii) a first polarising beam splitter arranged to receive light passing through the input polariser, and arranged to resolve said light into equal magnitude orthogonally polarised rays, said rays being mutually spaced and having a path difference therebetween,
   (iii) at least one additional polarising beam splitter arranged to receive light passing through the first polarising beam splitter,
   (iv) an output polariser orientated such that its transmission axis is parallel to or perpendicular to the transmission axis of the input polariser for resolving the orthogonally polarised light rays having passed through the or each additional polarising beam splitter into the same or perpendicular polarisation state as light resolved by the first polariser,
   (v) focussing means, the first polarising beam splitter, the or each additional beam splitter and the focussing means being mutually spaced such that said mutually spaced rays are brought to coincidence whereby interference fringes are produced, and,
   (vi) a light sensitive detector arranged to detect said interference fringes, wherein one polarising beam splitter is mounted for movement perpendicular to said longitudinal axis of the spectrometer, the other polarising beam splitter(s) being rigidly mounted against movement.

2. An apparatus as claimed in claim 1, wherein at least one polarising beam splitter is a Wollaston prism.

3. An apparatus as claimed in claim 2, wherein each of the polarising beam splitters of the imaging spectrometer is a Wollaston prism.

4. An apparatus as claimed in any preceding claim, wherein only a single additional polarising beam splitter is provided and the focussing means is a lens.

5. An apparatus as claimed in claim 4, wherein the polarising beam splitters are mutually positioned such that the orthogonally polarised rays having passed therethrough are linearly spaced and parallel, the lens being provided between the polarising beam splitters and the detector to bring said rays, after being resolved by the output polariser, into coincidence at the detector.

6. An apparatus as claimed in claim 5, wherein the first polarising beam splitter and one additional polarising beam splitter are identical mutually parallel Wollaston prisms which are oppositely orientated with respect to their wedge angles.

7. An apparatus as claimed in claim 4, wherein the polarising beam splitters are positioned between the lens and the detector, the mutual spacing of the beam splitters and the detector being such that the rays passing through the lens and the polarising beams splitters are brought to coincidence at the detector.

8. An apparatus as claimed in claim 1, wherein exactly two additional polarising beam splitters are provided, the polarising beams splitters being arranged such that the orthogonally polarised rays having passed therethrough are parallel or co-axial.

9. An apparatus as claimed in claim 8, wherein the polarising beam splitter and the two additional polarising beam splitters are two identical Wollaston prisms mounted in parallel, with a third Wollaston prism having twice the wedge angle of the other two Wollaston prisms being mounted therebetween.

10. An apparatus as claimed in claim 1, additionally comprising a processor, the detector being connected to the processor, said processor being capable of carrying out Fourier transformation on the interference fringes at the detector, whereby to yield the spectrum of light incident on the detector.

11. A method of generating a temporal interferogram comprising the steps of:

moving the polarising beam splitter mounted for movement within the imaging spectrometer of claim 1; and
generating a temporal interferogram.

* * * * *